(12) United States Patent
Chen et al.

(10) Patent No.: US 6,174,345 B1
(45) Date of Patent: Jan. 16, 2001

(54) METHOD AND AN EQUIPMENT FOR PRODUCING RAPID CONDENSATION HYDROGEN STORAGE ALLOY POWDER

(76) Inventors: Yu Chen; Yun Cai; Dongping Yu; Xugeng Dai, all of 142 Tianlin Road, Shanghai, 200233 (CN)

( * ) Notice: Under 35 U.S.C. 154(b), the term of this patent shall be extended for 0 days.

(21) Appl. No.: 09/029,878

(22) PCT Filed: Sep. 9, 1996

(86) PCT No.: PCT/CN96/00077

§ 371 Date: Jun. 10, 1998

§ 102(e) Date: Jun. 10, 1998

(87) PCT Pub. No.: WO97/09144

PCT Pub. Date: Mar. 13, 1997

(30) Foreign Application Priority Data

| Sep. 7, 1995 | (CN) | 95109468 |
| Sep. 7, 1995 | (CN) | 95221255 |
| Sep. 7, 1995 | (CN) | 95221256 |

(51) Int. Cl.[7] ........................ B22F 9/10
(52) U.S. Cl. ............ 75/351; 75/352; 148/513; 164/46; 164/471; 420/900
(58) Field of Search ............ 75/343, 351, 352; 148/513; 420/900; 164/114, 471, 46

(56) References Cited

U.S. PATENT DOCUMENTS 5,529,857 * 6/1996 Nogami et al. ............ 420/900
5,725,042 * 3/1998 Hirose et al. ............ 164/114
5,843,372 * 12/1998 Hasebe et al. ............ 420/900

FOREIGN PATENT DOCUMENTS

| 90106130 | 12/1990 | (CN) . |
| 0 587 258 A2 | 11/1994 | (EP) . |
| 2-253558 * | 10/1990 | (JP) . |
| 5-179372 | 7/1993 | (JP) . |
| 6-212213 | 8/1994 | (JP) . |
| 6-228613 | 8/1994 | (JP) . |
| 6-322401 | 11/1994 | (JP) . |
| 1100046 * | 6/1984 | (SU) . |

* cited by examiner

Primary Examiner—George Wyszomierski
(74) Attorney, Agent, or Firm—Burns, Doane, Swecker & Mathis, L.L.P.

(57) ABSTRACT

The present invention relates to a method and apparatus of manufacturing nickel-metal-hydride alloy powder material. The furnace charge of nickel-metal-hydride alloy is melted in vacuum or argon atmosphere in this invention. After melting, the molten alloy is gas atomized to fine spherical powder or centrifugal atomized to flaky shape. Then the powders are fed into a hydrogen heat treatment chamber for hydrogen heat treatment and pulverization. This invention integrates the melting, pulverizing and hydrogen treatment of nickel-metal hydride alloy powder into a whole step. It can charge and pulverize continuously and is suitable for the large-scale industrialized production of homogeneous composition and least segregation nickel-metal hydride alloy powder.

23 Claims, 4 Drawing Sheets

METHOD AND AN EQUIPMENT FOR PRODUCING RAPID CONDENSATION HYDROGEN STORAGE ALLOY POWDER

FIELD OF THE INVENTION

The present invention relates to a method and apparatus for manufacturing nickel-metal-hydride alloy powder by rapid solidification. More particularly, the present invention relates to a method and apparatus for manufacturing the $AB_5$ series and $AB_2$ series nickel-metal-hydride alloy powder.

BACKGROUND OF THE INVENTION

It is well known that hydrogen is a clean and ideal energy source with high energy density. The industrialized production of nickel-metal-hydride alloy powder is one of the most important tasks of personnel specialized in the metallurgical industry. The industrialized production of the nickel-metal-hydride alloy involves the manufacturing technology of the nickel-metal-hydride alloy and the relevant facilities.

The related prior art is as follows:

The chemical compositions of $AB_5$ type nickel-metal-hydride alloy in the prior art are almost the same, that is, they are obtained by modifications of $LaNi_5$ nickel-metal-hydride alloy invented in Holland in 1968. Said modification lies in that a low-price mixture of rare earth (Mm) is used as a hydrogen adsorption element instead of high-purity metal La. Optionally, a small amount of Ti, Zr, Ca and Mg is added as hydrogen adsorption elements for further increasing the hydrogen adsorption capacity of the nickel-metal-hydride alloy; or a part of Ni is replaced by Co, Mn, Al, or 1 to 2 kinds of M elements (M represents V, Cr, Fe, W, Mo, Nb, B, Si, Sn, Zn, N and so on) are added for improving anti-corrosion, cycling life and related comprehensive properties of the nickel-metal-hydride alloy, so as to ensure the performance characteristics of Ni—MH battery, such as high capacity, long life, high reliability, and to reduce the raw material cost.

$AB_5$ type nickel-metal-hydride alloy now has developed into an alloy almost the same as the MmNiCoMnAl series alloy. The ratio of hydrogen adsorption elements to non-hydrogen adsorption elements in $AB_5$ type nickel-metal-hydride alloy is generally 1:5, which is properly adjusted by the manufacturers according to their own conditions, by increasing or reducing the contents of hydrogen adsorption elements. The atomic amount of non-hydrogen adsorption elements is generally 4.8–5.2. The contents of various other elements are commonly: Ni 1.5–3.5, Co 1.5–3.5, Mn 0.1–1, Al 0.05–0.5. A small amount of metal M can be added with a content of about 0.02–0.2.

There are mainly two types of mixed rare earth metal Mm, that is the Lanthanum-enriched type and Cerium-enriched type. The contents of the main rare earth elements of La, Ce, Nd, Pr vary according to different places of origin of the raw materials. Generally, the total amount of La and Ce is more than 70% so as to ensure the hydrogen adsorption capacity of the nickel-metal-hydride alloy.

In the state of the art, the manufacture of nickel-metal-hydride alloy mostly emphasized the use of Ni—MH battery for negative electrode. For improving the comprehensive properties of the electrode, the alloy composition is adjusted and the alloy structure is improved accordingly. However, the prior art rarely concern the industrial production method of nickel-metal-hydride alloy. The production methods of $AB_5$ type nickel-metal-hydride alloy mentioned in the prior art can be summarized as follows:

1. Vacuum arc melting, casting and mechanical pulverizing method:

Mixed rare earth metal with high purity and proper particle size are blended metallic raw materials according to the proportion of alloy composition, and placed in a water cooling copper crucible, then evacuated and filled with Argon for arc melting. The above mixture needs to be melted several times for obtaining a homogeneous ingot, and then pulverized mechanically. Nickel-metal-hydride alloy is obtained by using this method in Japanese patent document nos. P3-289644, P4-52242 and P4-168240. The productivity of this method is low and can only be used in research work.

2. Vacuum induction melting, water cooled mould casting and mechanical crushing, pulverizing method:

As stated in Japanese patent document no. P3-188234, liquid metal, after being melted in a vacuum and optionally argon atmospheric induction furnace, is cooled quickly in plate water-cooled copper mould. A cast ingot having a column structure is obtained and then the mechanical crushing and pulverizing are used for powdering. The resulting mixture, under vacuum and optionally argon atmospheric protection, is heat treated at 900 to 1200° C. for structural homogenization. In this method, it is difficult to control the stable quality of the cast ingot in the production of ingots of less than $10\mu$ micro-crystal structure by using large capacity induction furnace.

3. Liquid metal single roller quick quenching and mechanical pulverization method:

Japanese patent document no. P2-301531 teaches that 5–15 mm blocks of $AB_5$, $AB_2$ and AB type metal-hydride alloy are made at first, then crushed coarsely and placed in a quartz tube for re-melting into liquid metal with high frequency induction heating under argon atmosphere. Then the resulting material is processed into strips by a high speed rotating (2,000 rpm) water cooled copper roller ($\phi 300\times 400$ mm), and fine powder is obtained by mechanical pulverization. Compared with other methods in the prior art, the quick quenching can improve the cooling speed, control the micro-structure of nickel-metal-hydride alloy, and increase the charge and discharge cycling life of the alloy powder.

4. Gas atomization method.

Japanese patent document no. P3-226408 teaches that $AB_5$ type liquid nickel-metal-hydride alloy could be atomized by high speed inert gas for manufacturing non-balance state nickel-metal-hydride alloy powder. Thus, it is possible to increase the capacity, depress the self-discharge of Ni—MH battery and prolong the cycling life.

The Japanese patent No.P5-222474 discloses that the powder is obtained by the atomization of liquid $AB_5$ type nickel-metal-hydride alloy MmNiCoMnAl+Zr under an Argon protection atmosphere. The cooling speed is >500° C./sec. An alloy with least segregation, micro-crystal and homogeneous structure can be obtained under homogenizing heat treatment at 600–900° C. for 2–5 hours. The corrosion-resistant property of the alloy can be improved and cycling life can be extended. Said method is suitable to be used for manufacturing a negative electrode of high capacity with an initial capacity of 300 mAh/g and long cycling life (with a charge and discharge cycling life of >500 times) Ni—MH battery. Said method can also omit the mechanical crushing and pulverization steps of casting an ingot and simplify the production process of nickel-metal-hydride alloy powder. However, it cannot satisfy the scale of industrial production.

5. High temperature reductive diffusion from rare earth oxide method.

In Japanese patent document no. P3-170601, high-purity rare earth oxide $La_2O_3$ (purity 99.99%), high-purity nickel powder (purity 99.9%) of 5.0–8.8μ, and reductive of high-purity Ca (purity 99%) are mixed homogeneously. The diffusion reaction is then proceeded in the reaction container at 970° C. for 1.5–4 hours. LaNi$_5$ alloy powder is obtained through cooling, water washing and filtering off the reaction product CaO, with a composition of La 31.4%, Ca 0.43–0.61%, O$_2$ 0.06–0.12%. The initial capacity of the alloy is 295–297 mah/g.

In Japanese patent document no. P3-281710, a mixed rare earth oxide (La$_2$O$_3$ 50.63/27.61, CeO$_2$ 2.81/50.1, Pr$_6$O$_{11}$/ 4.32, Sm$_2$O$_3$ 0.20/0.10), Ni powder, and CoMmCuAl metal oxide powder are blended homogeneously according to the chemical equivalent proportions of the nickel-metal-hydride alloy, with a small amount of Ca, Mg or Li being added. After mixing, MmNiCoMnAl alloy can be obtained by a high temperature reductive diffusion method, wherein the reaction temperature is 1,000–1,200° C., and the reaction time is 4–6 hours. Combining the rare earth oxide reduction, alloying and pulverization into one step can save the steps of mechanical crushing and pulverization of a cast ingot, improve the heat conductivity, electric conductivity, and reduce the danger of pulverization by hydrogenation. But, the technology is complex and can not be used in continuous production and cannot satisfy the requirement of large-scale production.

Except the aforementioned manufacturing methods, the methods and equipment for further homogeneous treatment and hydrogen heat treatment, especially the facilities for hydrogen heat treatment, of nickel-metal-hydride alloy powder are rarely reported. After studying, the applicants find that the further homogeneous treatment and hydrogen heat treatment of nickel-metal-hydride alloy powder can obtain a micro-crystal and homogeneous alloy structure with little segregation in composition, increased thermo-resistance and extended charge and discharge cycling life.

This invention is particularly developed for overcoming the shortcomings present in the existing method and equipment for manufacturing of nickel-metal-hydride alloy powder.

SUMMARY OF THE INVENTION

An object of the present invention is to provide a method of manufacturing nickel-metal-hydride alloy powder. This method is simple, feasible, highly efficient and suitable for the large scale and continuous industrialized production of nickel-metal-hydride alloy powder.

Another object of the present invention is to provide facilities for vacuum and optionally argon atmospheric induction melting and high pressure inert gas atomization suitable for manufacturing the nickel-metal-hydride alloy powder described in this invention;

A further object of the present invention is to provide facilities for centrifugal atomization and rapid solidification for manufacturing nickel-metal-hydride alloy micro-crystal powder.

Still another object of the present invention is to provide a spiral type hydrogenating continuous heat treatment apparatus suitable for manufacturing the nickel-metal-hydride alloy powder described in this invention.

The manufacturing method described in this invention comprises the steps of:
(a) pre-treating the raw materials to obtain an intermediate alloy to prevent the volatilization of the volatile component;
(b) melting the pretreated raw materials, the intermediate alloy thereof or a master alloy using a vacuum and optionally argon atmospheric induction furnace to form a molten alloy;
(c) atomizing the molten alloy using a high-pressure inert gas or centrifugal atomization to form an atomized alloy;
(d) passing the powder through a sieve;
(e) treating the powder with a hydrogen treatment to obtain the final product.

DETAILED DESCRIPTION OF THE INVENTION

Figure 1:
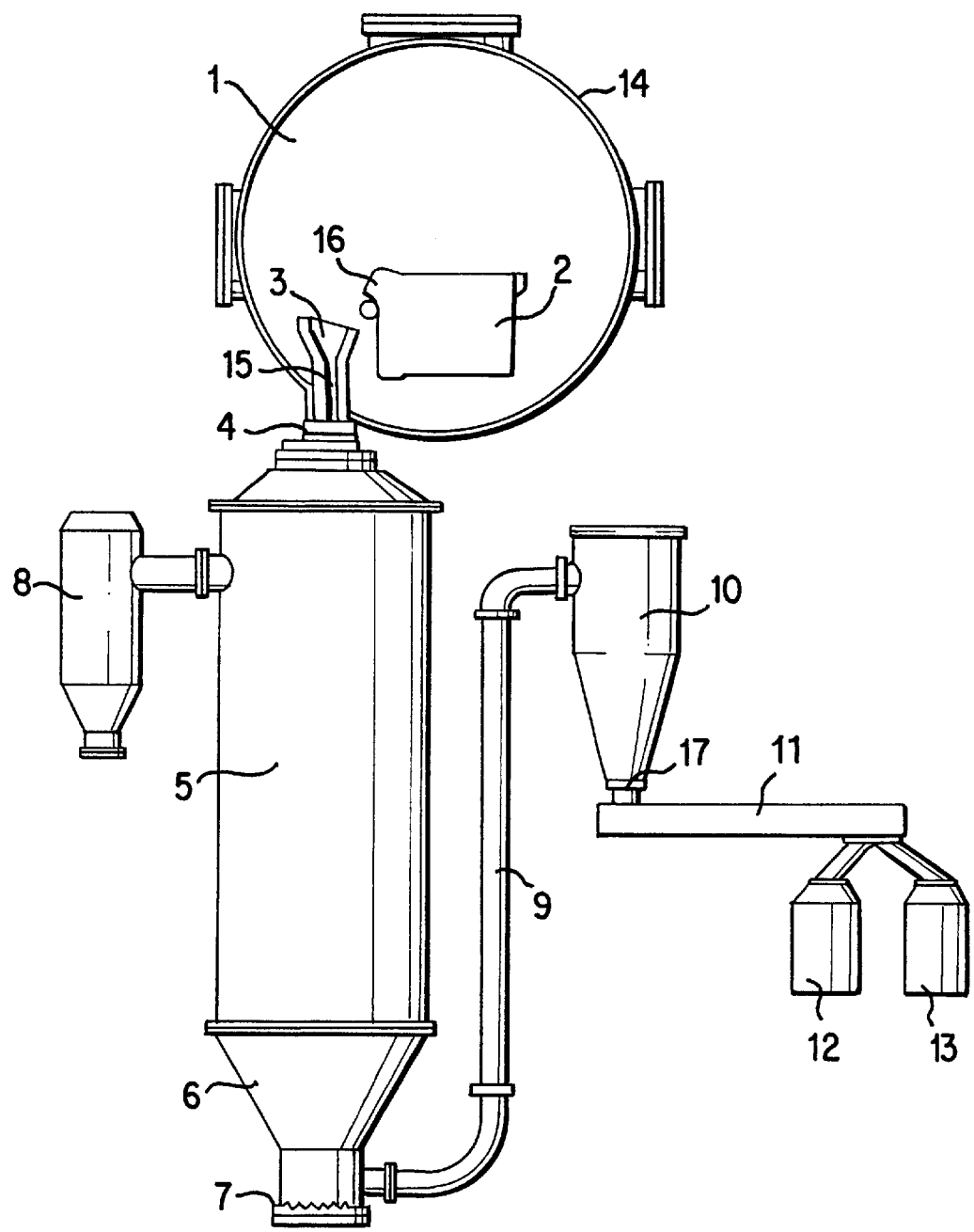
FIG. 1 is the schematic structural drawing of the vacuum and optionally argon atmospheric melting and high pressure inert gas atomization facilities described in the present invention.
Figure 2:
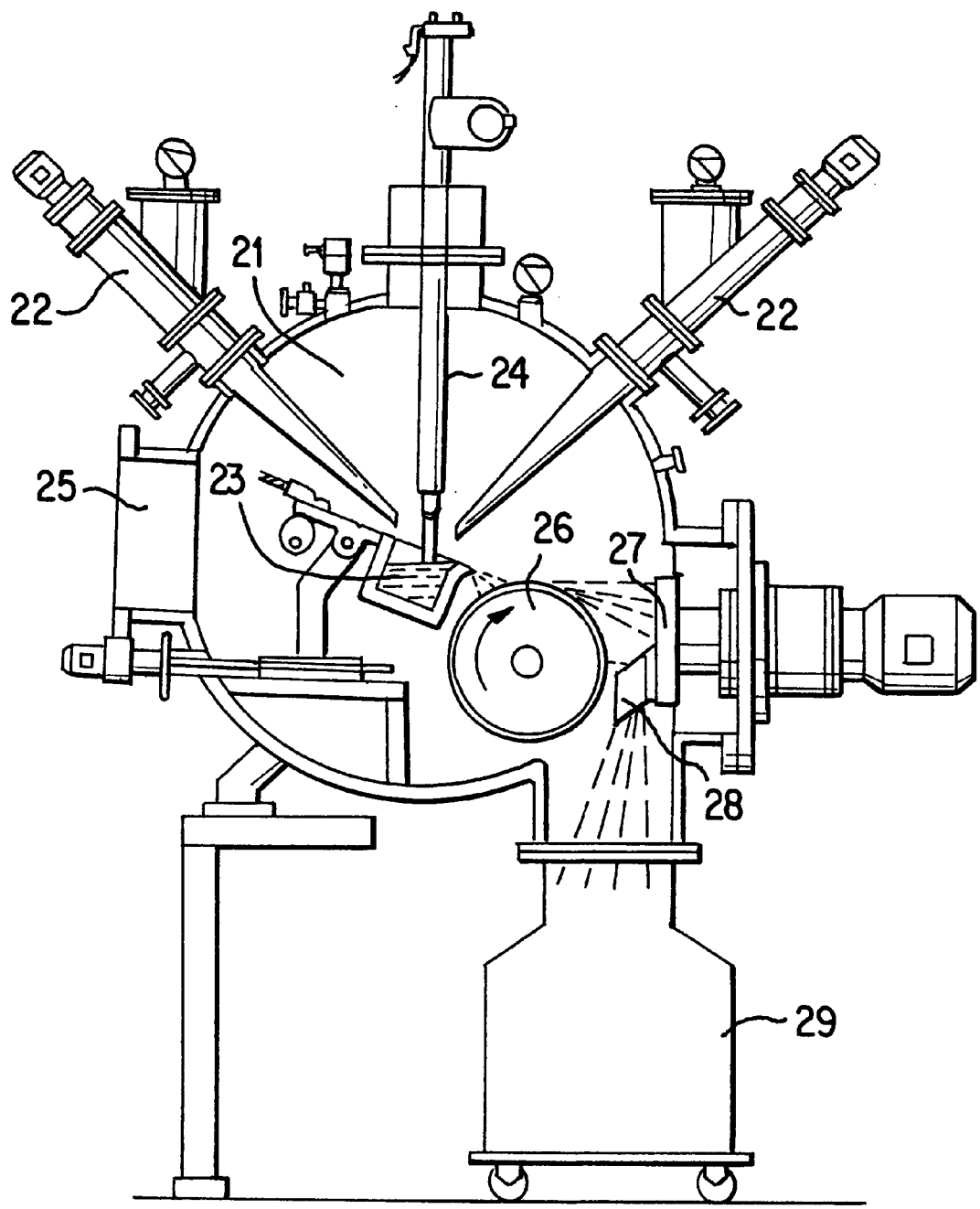
FIG. 2 is the structural schematic drawing of the centrifugal atomization and rapid solidification facilities described in the present invention.
Figure 3:
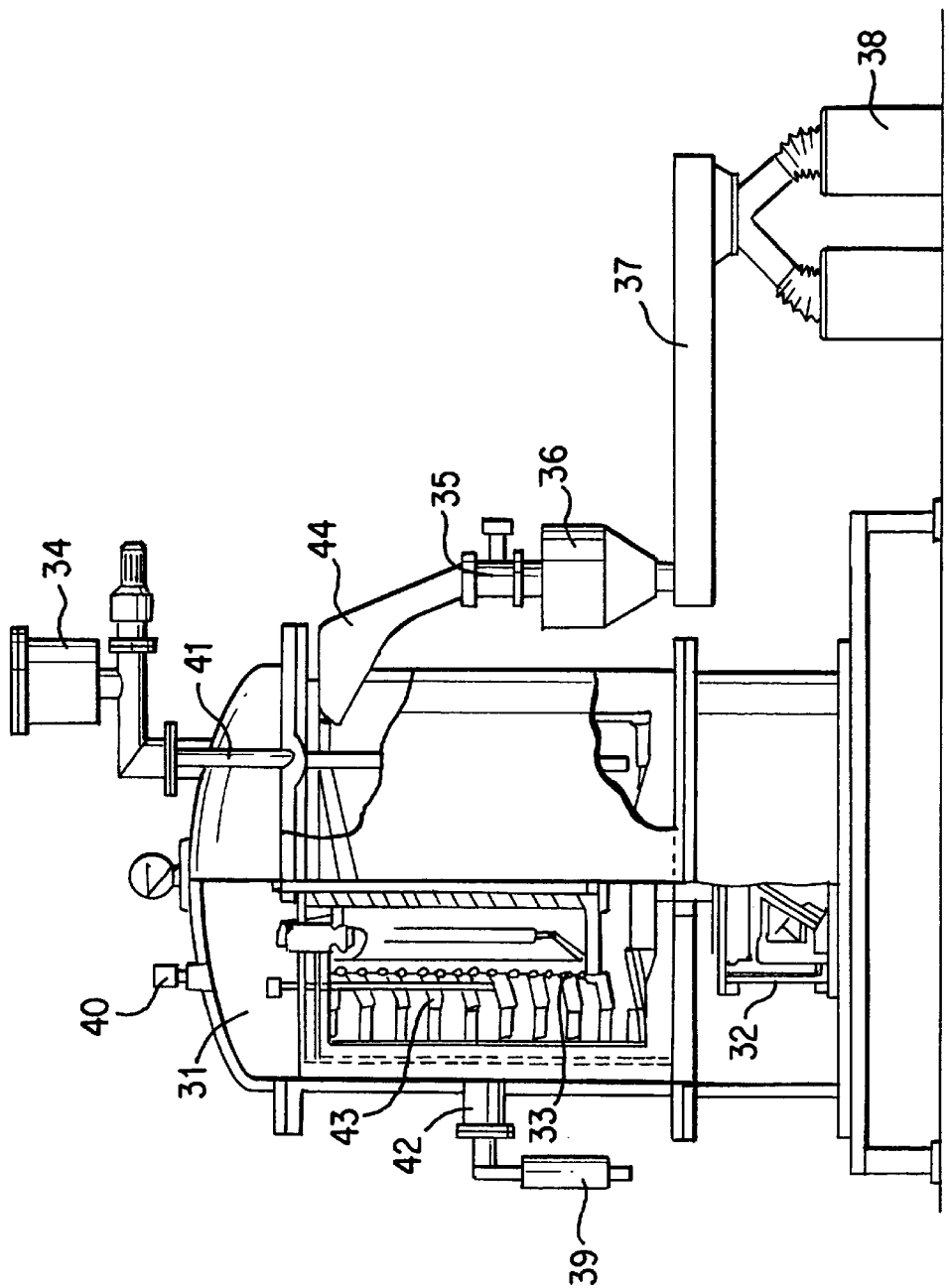
FIG. 3 shows the spiral type nickel-metal-hydride alloy powder hydrogenating continuous heat treatment facilities described in the present invention.

The numbers marked on the attached FIGS. 1–3 are defined as follows:

As shown in FIG. 1, the vacuum and optionally argon atmospheric melting and high pressure inert gas atomization powdering facilities 20 comprises vacuum chamber 1, induction furnace 2, intermediate ladle 3, middle pouring tube 15, high pressure inert gas atomizer 4, gas atomization chamber 5, cooling cone 6, fluidized bed 7, super-fine powder collector 8, conveying pipe 9, intermediate material tank 10, vibrating sieve 11, powder storage container 12, 13, vacuum chamber wall 14, pouring port 16, discharging port 17, control valve 18 and ring shape nozzle 19 (18 and 19 are not shown in the drawing).

As shown in FIG. 2, the centrifugal powdering facilities 30 comprise vacuum chamber 21, charger 22, water cooling copper crucible 23, crucible pouring port 24, vacuum evacuating port 25, centrifugal rotating disk 26, collecting disk 27, scraper 28, and collector 29. As shown in FIG. 3, the hydrogenating continuous heat treatment facilities 40 comprise hydrogenation chamber 31, spiral vibrating pulverizer 32, heating coil for spiral conveying pipe 33, feeder 34, discharger 35, intermediate material storage container 36, vibrating sieve 37, material storage container 38, and hydrogen cylinder 39.

There are two kinds of methods to produce nickel-metal-hydride alloy powder described in the present invention, one is vacuum and optionally argon atmospheric melting and high pressure inert gas atomization; the other is centrifugal atomization and rapid solidification; detailed descriptions are as follows:

The manufacturing method of nickel-metal-hydride alloy powder by vacuum and optionally argon atmospheric melting and high pressure inert gas atomization described in the present invention includes:
A. pre-treatment of the raw materials and furnace charge:
(1) The main compositions, such as the elements of La, Ce, Nd, Pr etc. in the mixed rare earth metals (Mm) available in the market offered by different manufacturers or under different brand numbers from a manufacture, are different.

The compositions of Mm supplied from some production places and manufacturers in China are listed in Table 1.

TABLE 1

| Places of production | Factory, Brand No. | La | Ce | Nd | Pr | Sm & other elements |
|---|---|---|---|---|---|---|
| A | (1) | 54.8 | 1.9 | 33.7 | 9.7 | |
|   | (2) | 75.1 | 5.28 | 0.57 | 19.71 | |
|   | (3) | 75 | 5.0 | <0.1 | 20.0 | |
| B | (4) | 41–51 | 3–5 | 35–41 | 9–11 | Sm 0.5 Y < 0.5 |
|   | (5) | 26 | 47 | 18 | 9 | |
| C | (6) | 57 | 16 | 18 | 9 | |
|   | (7) | 85 | 2 | 13 | | |
|   | (8) | 99 | | | | |
| D | (9) | 30.4 | 49.9 | 14.9 | 4.7 | |
|   | (10) | 25–35 | 40–45 | 5–15 | 2–10 | |
| E | (11) | 28.1 | 49.97 | 15.37 | 4.7 | Sm 0.12 |
| F | (12) | 41–51 | 3–5 | 35–41 | 20 | |

In order to ensure the steady quality of MmNiCoMnAl series nickel-metal-hydride alloy produced in large scale, it is necessary to stabilize the quality of raw materials. The Mm put in use is premixed strictly according to technical requirements, then melted using a vacuum induction furnace to adjust the ratio of main compositions. The pre-treated raw material of desired particle size is prepared and packed in vacuum to prevent oxidation.

(2) In order to control the effective addition amounts of the volatile alloy additives during vacuum melting of nickel-metal-hydride alloy, the intermediate alloys, for example, NiMg alloy, NiB alloy, BaAl alloy and so on, are prepared first.

(3) The preparation of MmNiCoMnAl master alloy.

B. The vacuum and optionally argon atmospheric melting and high pressure inert gas atomization The pretreated furnace charge, i.e. said intermediate alloy or nickel-metal-hydride master alloy mentioned above in section A is melted in a vacuum and optionally argon atmospheric induction furnace. An atomized alloy is formed when the molten alloy is atomized by high-pressure inert gas or centrifugal atomization. The atomized alloy is cooled at a cooling speed in the range from 1,000 to 5,000° C./second by a high-purity inert gas. The nickel-metal-hydride alloy powder with a spherical shaped micro-crystal structure can be obtained. The vacuum and optionally argon atmospheric melting is carried out in an induction electric furnace, and the molten alloy is atomized by a high purity inert gas (99.999%) under a pressure in the range from 40 to 60 atmospheres, and then is rapidly cooled and solidified to form a spherical shaped micro-crystal structure powder of the size from 120 to 350 mesh.

The method of vacuum and optionally argon atmospheric melting and high pressure inert gas atomization for producing nickel-metal-hydride powder can be carried out in the powdering facilities shown in FIG. 1 of this invention. The process of continuous charging and rapid pulverizing and continuous production can be fulfilled by using said facilities.

Said facilities can manufacture alloy powder under the protection of an inert gas atmosphere, such as Argon. The facilities for manufacturing a nickel-metal-hydride alloy powder by vacuum and optionally argon atmospheric melting-atomization comprise:

(a) a vacuum chamber wall 14 defining the vacuum chamber 1;
(b) an induction electric furnace 2 disposed in the lower middle part of the vacuum chamber 1 and having a pouring port 16;
(c) an intermediate ladle 3 disposed under the pouring port 16;
(d) a middle pouring tube 15 disposed under the intermediate ladle 3;
(e) a high-pressure inert gas atomizer 4 disposed under the middle pouring tube 15;
(f) a gas atomization chamber 5 disposed under the high-pressure inert gas atomizer 4;
(g) a cooling cone 6 disposed at the lower part of the gas atomization chamber 5;
(h) a fluidized bed 7 disposed at bottom of the gas atomization chamber 5;
(i) a super-fine powder collector 8 disposed at the upper part of the gas atomization chamber 5;
(j) one end of a conveying pipe 9 connected to the side wall of the fluidized bed 7;
(k) an intermediate material tank 10 connected to the other end of the conveying pipe 9 opposite the fluidized bed 7;
(l) a discharging port 17 comprising the lower part of the intermediate material tank 10;
(m) a vibrating sieve 11 connected to the discharging port 17; and
(n) one or more powder storage containers 12, 13 connected to the vibrating sieve 11.

The pretreated charge is melted in vacuum induction furnace 2, and the molten alloy is poured into an intermediate ladle 3 after a temperature adjusting step. By passing the molten alloy through a middle pouring tube 15 connected to the intermediate ladle 3, the molten alloy is introduced into an inert gas atomizer 4 at a desired temperature and flow rate.

By passing the high-pressure inert gas having a pressure in the range from 40 to 60 atmospheres into a ring-shaped nozzle through a control valve 18, liquid metal flow is atomized into from 120 to 350 mesh powder by the process of gas atomization. The cooling speed of said liquid alloy is normally in the range from 1,000 to 5,000° C./sec. A highly homogeneous, spherically shaped alloy powder with little segregation and micro crystal structure can be obtained. The powder is cooled in an atomization chamber 5 and a cooling cone 6, and then further cooled on a fluidized bed 7 using nitrogen gas, and sent by inert gas through a conveying pipe 9 into an intermediate storage tank 10, and dropped on a continuous vibrating sieve 11 through a discharging port 17. The alloy powder is sieved into different particle sizes and is transferred into powder storage container 12, 13 or other container, respectively. Finally, the nickel-metal-hydride alloy powder is vacuum packed.

A small amount of super-fine powder with a size of smaller than $10\mu$ is removed from the atomized alloy powder and collected in the super fine powder collector 8 that is connected to an upper part of the atomization chamber 5. The inert gas used in the inert gas fluidized bed and conveying pipe 9 is the recycled inert gas that has been used in the process of high-pressure gas atomization.

The highly efficient, economical, stable and mass production of nickel-metal-hydride alloy powder of high quality can be realized by using the method and facilities of this invention.

Another method of this invention is the process of centrifugal atomization and rapid solidification. Details are as follows:

(a) Pretreatment of raw materials and furnace charge in this embodiment is the same as the process described in the above section A.
(b) Centrifugal atomization and rapid solidification manufacturing alloy powder.

The pretreated furnace charge, that is, the intermediate alloy from (a), or master alloy, is melted. The spheroidic shaped micro-crystal powder is obtained from the molten alloy by centrifugal atomization and rapid solidification using a high speed rotating disk. Specifically, after pretreatment, the furnace charge (master alloy) is melted in a vacuum argon arc furnace, the molten alloy is poured into a high speed rotating disk and atomized centrifugally into small liquid drops. After being cooled on the collecting disk 27, the spheroidic shaped nickel-metal-hydride alloy powder of 0.5–3 mm is obtained, having fine micro-crystal structure, with a grain size in the range of 0.05–5.0$\mu$. The rotating speed of the high-speed centrifugal atomization rotating disk and the powder-collecting disk is in the range from 2,000 to 6,000 rpm.

The process can be carried out in centrifugal atomization and rapid solidification facilities 30 shown in FIG. 2 of this invention. The facilities 30 comprise; a vacuum chamber 21; two chargers 22 connected to the vacuum chamber 21; a water-cooling copper crucible 23 disposed at the center of the vacuum chamber 21 and having a pouring port; a vacuum evacuating port 25 disposed on a side wall of the vacuum chamber 21; a centrifugal rotating disk 26 disposed under the pouring port 24 of the crucible 23; a collecting disk 27 adjacent and perpendicular to the centrifugal rotating disk 26; a scraper 28 adjacent to the surface of the collecting disk 27 defining a fine clearance therebetween, and a collector 29 disposed under the collecting disk 27 for collecting powder scraped therefrom by the scraper 28. When running, two automatic chargers 22 of the same structure are opened and closed alternatively by means of a control valve and continuously charge the furnace charge or the nickel-metal-hydride master alloy into the water-cooling copper crucible 23 inside vacuum chamber 21. The pouring device comprises an automatic tilting device for adjusting the tilting angle of the pouring port 24. The maximum vacuum at vacuum evacuating port 25 is $5 \times 10^{-4}$ torr.

The centrifugal atomization system consists of a high speed centrifugal rotating disk 26 and a powder collecting disk 27 that is adjacent and perpendicular to centrifugal rotating disk 26. The rotating speeds of the two disks are both in the range from 2,000 to 6,000 rpm. The liquid metal is poured into the high speed rotating disk 26 at a desired flow rate and is atomized into small liquid drops and thrown on collecting disk 27 by centrifugal force. The drops solidified on the disk 27 enter into collector 29 after being scraped off by scraper 28.

The powder obtained by high-speed rotating centrifugal atomization has a spheroidic shape with a radial size in the range from about 0.5 to 3.0 mm and a thickness in the range from about 10 to 100$\mu$. The powder has a fine micro-crystal structure with a grain size in the range from 0.05 to 5$\mu$. The process of continuous charging, continuous melting and continuous powder making can be realized with the high-speed rotating disk centrifugal atomization facilities. Thus, it can not only reduce production cost, but can also increase production efficiency. The use of the water-cooling copper crucible can eliminate molten alloy contamination from crucible material and reduce non-metallic impurities. The introduction of argon, nitrogen or other inert gas into the furnace cannot only accelerate melting, reduce oxidation of molten metal, but can also uniformly heat molten metal. It is advantageous to the manufacture of nickel-metal-hydride alloy powder of micro-crystal structure with little impurities and segregation.

The powder manufactured by the two methods mentioned above can be hydrogenated in the hydrogenating treatment facilities 40 of this invention.

The hydrogenating treatment facilities 40 of this invention comprise:

(a) a hydrogen heat treatment chamber 31;

(b) a feeding port 41 disposed or the top of chamber 31, a feeder 34 connected to the feeding port 41 for feeding nickel-metal-hydride alloy powder therethrough into the chamber 31;

(c) a hydrogen charging port 42 on the side wall of the chamber 31, and a hydrogen gas cylinder 39 disposed outside the chamber for feeding hydrogen of 99.999% purity into the chamber 31 via the hydrogen charging port 42;

(d) a spiral vibrating pulverizer 32 disposed at the bottom portion inside the chamber 31;

(e) a spiral conveying chute 43 disposed on the upper part of the inner wall of the chamber 31;

(f) a spiral conveying chute heating coil 33 disposed inside the spiral chute 43;

(g) a discharging port 44 disposed on a side wall of the chamber 31, and connected to a discharger 35;

(h) an intermediate material storage container 36 connected to the lower end of the discharger 35 opposite the chamber;

(i) a vibrating sieve 37 disposed under the intermediate material storage container 36; and (j) one or more material storage containers 38 disposed under the vibrating sieve 37.

The continuous hydrogen treatment of nickel-metal-hydride alloy powder of this invention comprises the steps of:

(a) Charging with a hydrogen cylinder 39 99.999% pure hydrogen through the hydrogen charging port 42 into the hydrogen heat treatment chamber 31 of the hydrogenating treatment facilities to produce a hydrogen atmosphere;

(b) Feeding the nickel-metal-hydride alloy powder from the feeder 34 into the hydrogen heat treatment chamber 31;

(c) Crushing and pulverizing the fed powder by means of a spiral vibrating pulverizer 32 disposed at the bottom of the chamber;

(d) Passing the pulverized powder into a spiral conveying chute 43 of a spiral conveying chute heating coil 33 along a spiral line, thereby heating the pulverized powder;

(e) Passing the heated powder through a discharge tube, a discharge port 44; and a discharger 35;

(f) Introducing the discharged powder into an intermediate material storage container 36;

(g) Passing the stored powder into a vibrating sieve 37, wherein the powder is separated into powder of different meshes; and (h) Storing the separated powder in one or more material storage containers according to the different meshes of the powder.

The period for heating of the crushed powder in the spiral conveying chute is generally from 5 to 20 minutes with the temperature not higher than 850° C. The hydrogen treatment process can be performed either under normal pressure (760 mmHg) or at a pressure of 10 bar.

The spiral type hydrogen continuous heat treatment facilities of this invention can be used either for continuous homogeneous treatment and hydrogen heat treatment or be used with other production facilities together in complete set and thus form a whole set of continuous production equipment and technology of powdering, hydrogen activation treatment and sieving for the manufacture of nickel-metal-hydride alloy powder. The highly efficient, high quality, economical, stable and large-scale industrialized production of nickel-metal-hydride alloy powder material can be realized.

EXAMPLE 1

The powdering facilities for vacuum and optionally argon atmospheric melting and high-pressure inert gas atomization shown in FIG. 1 and method for manufacturing nickel-metal-hydride alloy powder by vacuum and optionally argon atmospheric melting and high-pressure inert gas atomization of this invention are used to produce $AB_5$ nickel-metal-hydride alloy powder.

The process of treating the raw material and the furnace charge are the same as that described above.

In order to control the amount of volatile alloy during vacuum melting, the intermediate alloys such as NiMg alloy, NiB alloy, BaAl and so on are prepared first.

In order to prevent the harmful elements and impurities from contaminating the nickel-metal-hydride alloy, the physical data of the raw material, such as chemical composition, surface quality, block size and so on are strictly inspected. The charge is added strictly according to technical requirements of casting ingot for controlling stable quality.

The pre-treated furnace charge is melted under vacuum, and then optionally in an argon atmosphere, in induction furnace 2, and liquid metal is poured into an intermediate ladle 3 and middle pouring tube 15 after a temperature control step. The molten alloy is introduced into a high-pressure inert gas atomizer 4 with ring shaped nozzle at a desired temperature and flow rate. The inert gas having a pressure in the range of 40–60 atmosphere is introduced through control valve, then molten alloy is atomized to form a 120 to 350 mesh powder which is subsequently cooled by gas atomization chamber 5 and cooling cone 6 and introduced into a fluidized bed. In the fluidized bed 7, the powder is further cooled by inert gas. The alloy powder is sent by inert gas into an intermediate tank 10 through a conveying pipe 9, then continuously sieved by a vibrating sieve 11 for sieving into products of different particle sizes. The product is loaded into a storage container 12 and sealed in vacuum or inert gas.

The powder smaller than 10 $\mu$m formed during atomization is collected by a super-fine powder collector 8.

EXAMPLE 2

The facilities of high speed rotating disk centrifugal atomization and rapid solidification shown in FIG. 2 and the corresponding method of this invention are suitable for manufacturing $AB_5$, AB and $AB_2$ types of metal hydride alloy powder.

In this example, the process of pretreatment of the raw material and furnace charge is the same as that mentioned above.

The pretreated raw material is charged through two automatic chargers 22 of the same structure. During operation, the two chargers opened and closed alternatively by means of control valves, so that the pretreated raw material is added continuously into a water-cooling copper crucible 23 inside a vacuum chamber 21 for performing melting. The molten liquid metal in the copper crucible 23 is poured into a high-speed centrifugal atomization rotating disk 26 at a desired flow rate, and atomized into small liquid drops, then thrown onto a powder collecting disk 27 and dropped into a material storage container 29 after being scraped down by the scraper 28. The rotating speed of centrifugal atomization disk 26 and collecting disk 28 is in the range from 2,000 to 6,000 rpm. The powder manufactured has a spheroidic shape, and the thickness of the powder is in the range from 10 to 100 $\mu$m, and its grain size is in the range from 0.5 to 5.0 $\mu$m.

EXAMPLE 3

As shown in FIG. 3, the hydrogen heat treatment chamber 31 provided by this example of the invention is a cylindrical chamber, comprising:

(k) a hydrogen heat treatment chamber 31;

(l) a feeding port 41 disposed on the top of the chamber 31, a feeder 34 connected to the feeding port 41 for feeding nickel-metal-hydride alloy powder therethrough into the chamber 31;

(m) a hydrogen charging port 42 disposed on the side wall of the chamber 31, hydrogen gas cylinder 39 disposed outside the chamber for feeding hydrogen of 99.999% purity into the chamber 31 therethrough;

(n) a spiral vibrating pulverized 32 disposed at the bottom portion inside the chamber 31;

(o) a spiral conveying chute 43 disposed on the upper part of the inner wall of the chamber 31;

(p) a spiral conveying chute heating coil 33 disposed inside the spiral chute 43;

(q) a discharging port 44 disposed on a side wall of the chamber 31, and connected to a discharger 35;

(r) an intermediate material storage container 36 connected to the lower end of the discharger 35 opposite the chamber;

(s) a vibrating sieve 37 disposed under the intermediate material storage container 36; and (t) one or more material storage containers 38 disposed under the vibrating sieve 37.

EXAMPLE 4

The grain size of nickel-metal-hydride alloy powder with high purity and free of segregation manufactured by the method described in this invention is 0.05 to 5.0 $\mu$m, the powder size is in the range from 120 to 350 mesh, and the capacity is 260 to 300 mAh/g. For examining the eletrochemical properties of the powder, said nickel-metal-hydride alloy powder is mixed with a high-activity electric conductive additive and bonding agent. The mixture is pasted on nickel foam to form a high capacity negative electrode. The Ni—MH battery is obtained by matching and separating said negative electrode with a pasting or sintering type positive electrode. The properties of an AA type Ni—MH battery is shown in the following table.

|  | 0.2 C capacity | 4 hours voltage | 1.0 C capacity | 40 minutes voltage |
| --- | --- | --- | --- | --- |
| Battery 1 | 1360 mAh | 1.244 V | 1265 mAh | 1.237 V |
| Battery 2 | 1368 mAh | 1.253 V | 1283 mAh | 1.236 V |
| Battery 3 | 1342 mAh | 1.237 V | 1247 mAh | 1.235 V |

Figure 4:
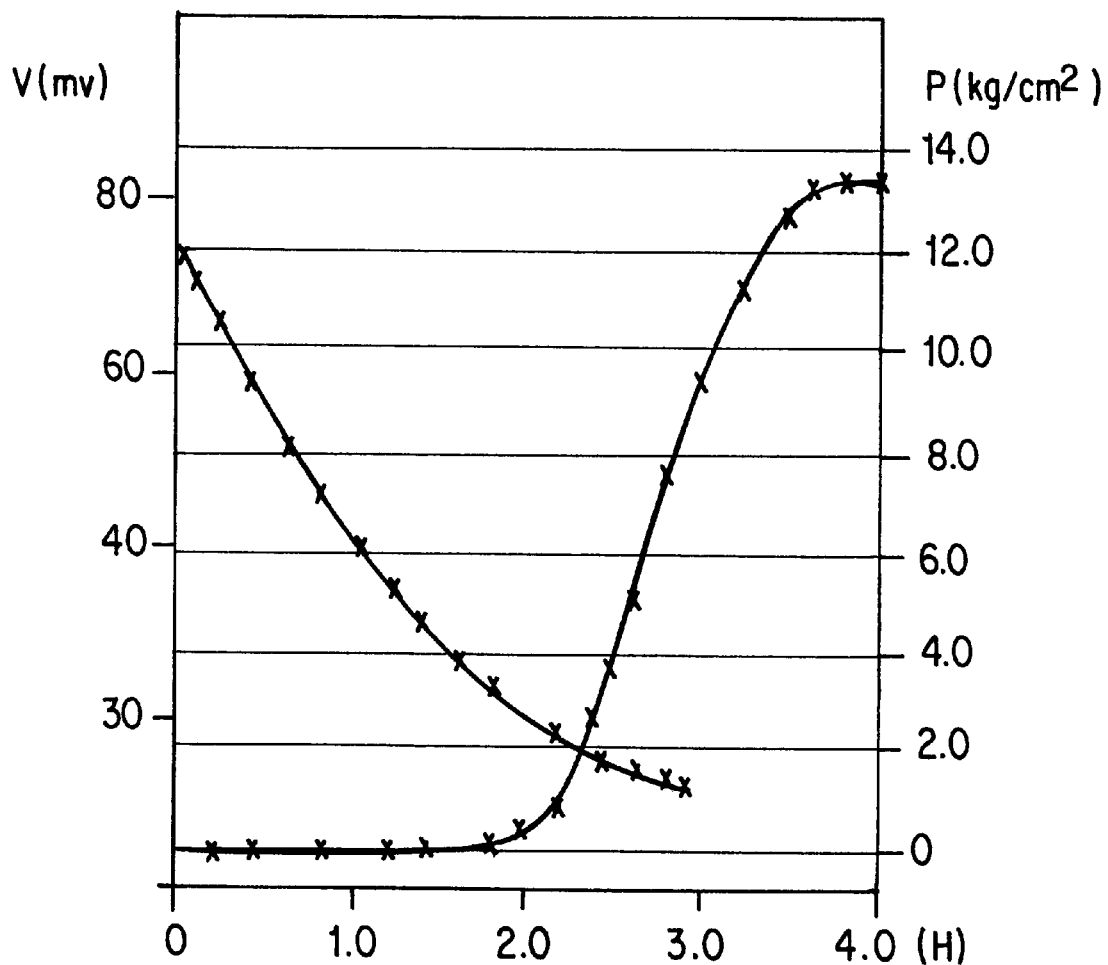
FIG. 4 shows the internal pressure curve of an AA-type battery described in the present invention.

Charge current 0.4 C, 3.5 hours;
Discharge current 0.2 C, end voltage 1.0 V; and
The charge and discharge curves are shown in FIG. 4.

The method of this invention can integrate melting, powder pulverizing and hydrogenating of nickel-metal-hydride alloy into one whole to realize continuous production of nickel-metal-hydride powder. It is suitable for large-scale industrialized production. The cost is considerably reduced, while the quality and stability of the product could be improved significantly. The charge and discharge properties of battery made by the powder of this invention are superior to that made by the existing technique.

What is claimed is:

1. A method of manufacturing a nickel-metal-hydride alloy powder by rapid solidification, comprising the steps of:
   (a) pre-treating a raw material, wherein the pre-treating comprises adjusting the composition of the raw material;
   (b) melting the pretreated raw material, an intermediate alloy thereof or a master alloy thereof of a desired particle size using vacuum or argon atmospheric induction to form a molten alloy;
   (c) atomizing the molten alloy using a high-pressure inert gas or centrifugal atomization to form an atomized alloy;
   (d) cooling and condensing the atomized alloy to form a nickel-metal-hydride alloy powder comprising microcrystal particles of spherical or spheroidic shape;
   (e) passing the powder through a sieve;
   (f) treating the powder with a hydrogen treatment in a spiral hydrogen treatment apparatus; and
   (g) sealing the powder under vacuum.

2. The method according to claim 1, wherein the melting is performed in a vacuum or argon atmospheric induction electric furnace.

3. The method according to claim 2, wherein the maximum pressure at a vacuum excavating port of the vacuum or argon atmospheric induction electric furnace is $5 \times 10^{-4}$ Torr.

4. The method according to claim 1, further comprising the steps of:
   pouring the molten alloy into an intermediate ladle after a temperature control step;
   passing the molten alloy through a middle pouring tube connected to the intermediate ladle; and
   introducing the molten alloy into an inert gas atomizer at a desired temperature and flow rate to perform step (c).

5. The method according to claim 4, wherein the high-pressure inert gas used in the inert gas atomizer is passed into a ring-shaped nozzle through a control valve.

6. The method according to claim 5, wherein the high-pressure inert gas has a pressure in the range from 40 to 60 atmospheres.

7. The method according to claim 4, wherein the nickel-metal-hydride alloy powder is from 120 to 350 mesh.

8. The method according to claim 1, wherein the step (d) cooling of the atomized alloy is conducted at a cooling speed in the range from 1,000 to 5,000° C./second by a high-purity inert gas.

9. The method according to claim 1, wherein in step (d), the powder is cooled in an atomization chamber and a cooling cone, and the powder is cooled on a fluidized bed using nitrogen gas.

10. The method according to claim 1, further comprising the step of removing from the atomized alloy of step (c) micro-fine powder smaller than 10 $\mu$m in a powder collector.

11. The method according to claim 1, wherein the step (a) of pre-treating a raw material comprises the step of adding rare-earth metals to the raw material.

12. The method according to claim 1, further comprising the step of:
   continuously charging the pretreated raw material, an intermediate alloy thereof or a master alloy thereof of a desired particle size into a water-cooled copper crucible inside a vacuum chamber, for performing the vacuum or argon atmospheric melting using two chargers automatically and alternately opening and closing by controlling valves thereof.

13. The method according to claim 1, further comprising the steps of:
   pouring the molten alloy from a pouring port of a pouring device into a high-speed centrifugal atomization rotating disk at a desired flow rate, the molten alloy being atomized into a nickel-metal-hydride alloy powder and thrown by centrifugal force therefrom;
   collecting the nickel-metal-hydride alloy powder thrown from the atomization rotating disk on a powder-collecting disk;
   scraping the nickel-metal-hydride alloy powder off the powder-collecting disk using a scraper; and
   collecting the nickel-metal-hydride alloy powder in a material storage container.

14. The method according to claim 13, wherein the rotating speed of the high-speed centrifugal atomization rotating disk and the powder-collecting disk is in the range from 2,000 to 6,000 rpm.

15. The method according to claim 13, wherein the pouring device comprises an automatic tilting device for adjusting the tilting angle of the pouring port.

16. The method according to claim 13, wherein the nickel-metal-hydride alloy powder comprises flat spheroidic shaped particles having a thickness in the range from about 10 to 100 $\mu$m and a radial size in the range from about 0.5 to 3.0 mm.

17. The method according to claim 1, wherein the step (f) of treating the powder with a hydrogen treatment comprises the steps of:
   charging with a hydrogen charger 99.999% pure hydrogen through a hydrogen charging port into a hydrogen heat treatment chamber of the hydrogen treatment apparatus to produce a hydrogen atmosphere;
   feeding the nickel-metal-hydride alloy powder into the hydrogen heat treatment chamber using a feeder;
   crushing the fed powder using a spiral vibrating crusher disposed at the bottom of the chamber;
   passing the crushed powder into a spiral conveying chute of a spiral conveying chute heating coil along a spiral line, thereby heating the crushed powder;
   passing the heated powder through a discharge tube, a discharge port, and a discharger;
   introducing the discharged powder into an intermediate material storage container;
   passing the stored powder into a vibrating sieve, wherein the powder is separated into different grades; and
   storing the separated powder in one or more material storage containers according to the different grades of the powder.

18. The method according to claim 17, wherein the period for the heating of the crushed powder is from 5 to 20 minutes.

19. The method according to claim 18, wherein the maximum temperature of the heating is 850° C.

20. The method according to claim 19, wherein the powder is crushed using a spiral vibrating crusher at atmospheric pressure.

21. The method according to claim 19, wherein the powder is crushed using a spiral vibrating crusher at a pressure of 10 bar.

22. The method according to claim 1, wherein the high-pressure inert gas is nitrogen gas or argon gas having a purity of 99.999%.

23. The method according to claim 1, further comprising the step of adding rare-earth metals to the raw material, the intermediate alloy thereof or the master alloy thereof during step (a).

* * * * *